United States Patent
Günther et al.

(10) Patent No.: US 11,059,607 B2
(45) Date of Patent: Jul. 13, 2021

(54) NAVIGATION SATELLITE, IN PARTICULAR FOR A MEDIUM EARTH ORBIT

(71) Applicant: DEUTSCHES ZENTRUM FÜR LUFT-UND RAUMFAHRT, Cologne (DE)

(72) Inventors: Christoph Günther, Weßling (DE); Christopher Schmidt, Munich (DE)

(73) Assignee: Deutsches Zentrum Für Luft-Und Raumfahrt E.V., Cologne (DE)

( * ) Notice: Subject to any disclaimer, the term of this patent is extended or adjusted under 35 U.S.C. 154(b) by 0 days.

(21) Appl. No.: 16/629,433

(22) PCT Filed: Jul. 10, 2018

(86) PCT No.: PCT/EP2018/068675
§ 371 (c)(1),
(2) Date: Jan. 8, 2020

(87) PCT Pub. No.: WO2019/011919
PCT Pub. Date: Jan. 17, 2019

(65) Prior Publication Data
US 2020/0140122 A1    May 7, 2020

(30) Foreign Application Priority Data
Jul. 14, 2017 (DE) ............ 10-2017-212-092.4

(51) Int. Cl.
*B64G 1/10* (2006.01)
*H04B 10/118* (2013.01)

(52) U.S. Cl.
CPC ......... *B64G 1/1014* (2013.01); *H04B 10/118* (2013.01)

(58) Field of Classification Search
CPC ................. B64G 1/1014; H04B 10/118
See application file for complete search history.

(56) References Cited

U.S. PATENT DOCUMENTS 5,218,467 A * 6/1993 Ross ............ H04B 7/18521
                                               398/123
6,246,501 B1   6/2001 Dreischer et al.
(Continued)

FOREIGN PATENT DOCUMENTS

EP    0876013 A1    11/1998
EP    2605044 A2    6/2013

OTHER PUBLICATIONS

Benzi et al., "Optical Inter-Satellite Communication: the Alphasat and Sentinel-1A in-orbit Experience", SPACEOPS 2016 Conference, Reston, VA, whole document, May 13, 2016.
(Continued)

*Primary Examiner* — Mina M Shalaby
(74) *Attorney, Agent, or Firm* — Christensen, Fonder, Dardi & Herbert PLLC; Peter S. Dardi; Peder Jacobson

(57) ABSTRACT

The invention relates to a navigation satellite (10, 10', 10"), in particular for a medium earth orbit (MEO), having a housing (12) and a navigation antenna (16) connected to the housing (12) for emission of navigation signals in a preferred direction. Furthermore, the navigation satellite (10, 10', 10") has an optical communication system (22) for unidirectional or bidirectional signalling having at least one other satellite advancing in the direction of movement and/or having at least one other satellite following in the direction of movement. The navigation satellite (10, 10', 10") has a holder (for example as navigation antenna), which is arranged rotatably on the housing (12) about an axis of rotation (17), the optical communication system being (22) arranged on the holder.

20 Claims, 2 Drawing Sheets

(56) References Cited

U.S. PATENT DOCUMENTS

Figure 1:
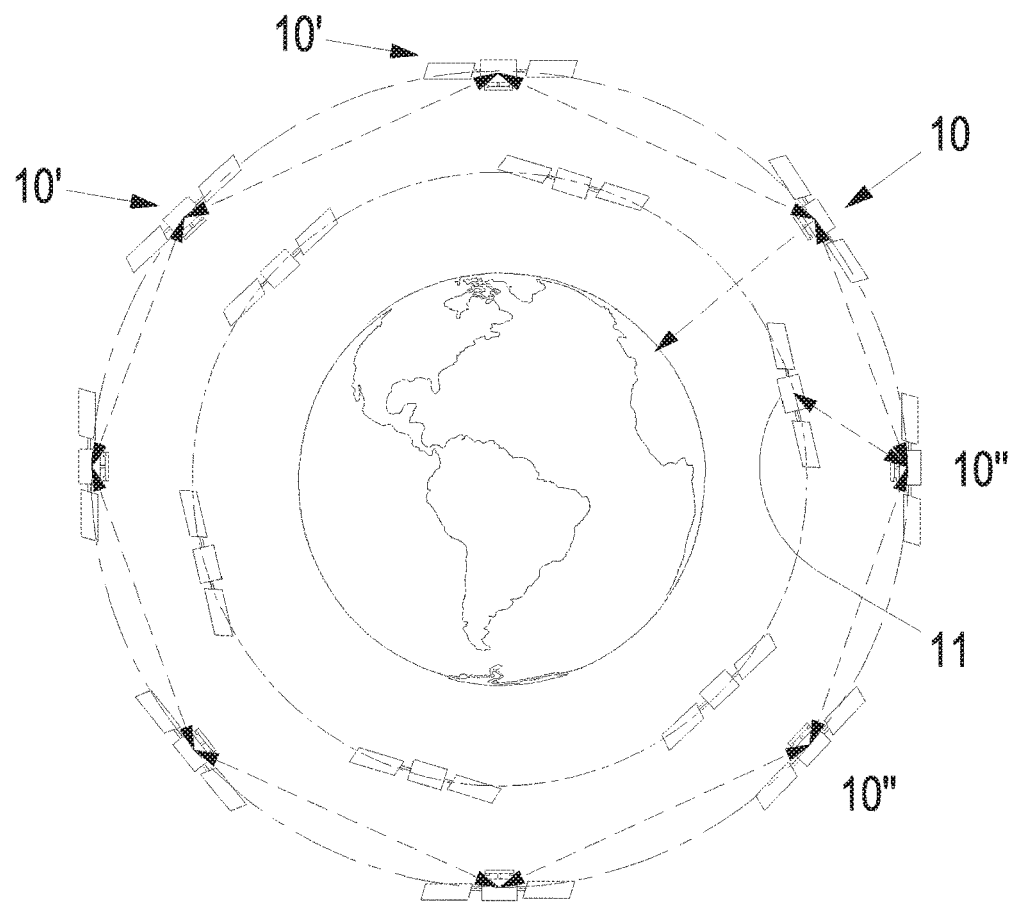

| | | | | |
|---|---|---|---|---|
| 6,304,354 B2* | 10/2001 | Carlson | ............... | H04B 10/118 398/122 |
| 6,449,076 B1* | 9/2002 | Loveridge | ............ | H04B 10/118 398/121 |
| 7,925,167 B1* | 4/2011 | Kozubal | .............. | H04B 10/118 398/125 |
| 9,573,702 B1* | 2/2017 | Jacomb-Hood | .......... | B64G 1/52 |
| 9,723,386 B1* | 8/2017 | Ni | ...................... | H04Q 11/0066 |
| 2004/0179847 A1 | 9/2004 | Johnson et al. | | |
| 2007/0080858 A1 | 4/2007 | O'Brien et al. | | |
| 2008/0118247 A1* | 5/2008 | Drago | .................. | H04B 10/118 398/122 |
| 2009/0012662 A1* | 1/2009 | Liu | ....................... | G01S 5/0247 701/13 |
| 2013/0158743 A1 | 6/2013 | Prunean | | |
| 2014/0016941 A1* | 1/2014 | Coleman | ............ | H04B 7/18521 398/121 |
| 2016/0094288 A1 | 3/2016 | Krebs | | |
| 2017/0005719 A1 | 1/2017 | Krebs | | |
| 2017/0026121 A1* | 1/2017 | Everett | ................ | H04B 10/118 |
| 2017/0026122 A1* | 1/2017 | Everett | ................ | H04B 10/118 |
| 2017/0366251 A1 | 12/2017 | Ravishankar et al. | | |
| 2018/0323863 A1* | 11/2018 | Bournes | ............. | H04B 7/18521 |

OTHER PUBLICATIONS

International Search Report for Application No. PCTEP2018/068675 dated Sep. 10, 2018.

* cited by examiner

NAVIGATION SATELLITE, IN PARTICULAR FOR A MEDIUM EARTH ORBIT

This application is a national stage application of PCT application PCT/EP2018/068675 to Gunther et al., filed Jul. 10, 2018, which claims priority to DE application 10-2017-212-092.4 filed on Jul. 14, 2017, both of which are incorporated herein by reference.

The invention relates to a navigation satellite which is particularly provided for a Medium Earth Orbit (MEO).

Optical connections between navigation satellites allow for a highly precise synchronization of clocks (so-called "composite clock"), a precise distance measurement and the transport of important data without external support. The navigation satellites must be provided with optical transmitting and receiving devices to allow for the aforementioned.

The flight attitude of a navigation satellite in the Medium Earth Orbit (MEO) presents a particular challenge. The flight attitude is determined by the fact that the navigation antenna permanently has to point to the center of the Earth (nadir pointing) and the solar generators always have to be directed towards the Sun. The first request specifies the attitude up to a rotation about the nadir axis, i.e. the connection between the centers of gravity of the Earth and the satellite.

Two further axes are required for aligning the solar generators. One is the nadir axis and the other one is the axis on which the generators are mounted and about which the generators are rotatable. Since the satellite comprises cold a warm sides to be maintained, the satellite is in addition rotated near the point nearest to the Sun and furthest from the Sun about the nadir axis by respectively 180° degrees. The first rotation is called "noon-turn" and the second is called "mid-night turn".

The state of the art consists more or less of alignable optical transmitting and receiving systems, e.g. TESAT LCT (see e.g. BENZI, E. [et al.]: Optical Inter-Satellite Communication: the Alphaset and Sentinel-1A in-orbit experience. In: Proc. SpaceOps 2016 Conference, 16-20 May 2016, Daejeon, Korea, (AIAA 2016-2389). AIAA [online], DOI: 10.2514/6.2016-2389 [accessed 14 Jun. 2018]. These are first of all complicated to realize and require a variable geometry between the optical systems and the phase center of the L-band antenna, for example. The navigation antenna of todays navigation satellites is firmly connected to the satellite structure, i.e. the housing (also called satellite bus), such that a rotation of the satellite about the vertical axis also implies a rotation of the navigation antenna and its emission characteristics.

In US-A-2017/0005719 a constellation of a plurality of satellites for communication among each other as well as with ground stations is described.

US-A-2004/0179847 refers to a satellite with mirror optics for communication with other satellites.

It is an object of the invention to provide a navigation satellite which enables, despite the required two rotations by respectively 180° degrees during a revolution around the Earth, to maintain an optical communication connection to neighboring satellites in the same orbit.

This object is achieved by the invention proposing a navigation satellite, particularly provided for a Medium Earth Orbit (MEO), comprising a housing (i.e. a satellite structure or a satellite bus),
a navigation antenna connected to the housing for the emission of navigation signals in a preferred direction,
an optical communication device for unidirectional or bidirectional signaling with at least one other satellite advancing in the direction of movement towards a first communication axis and/or with at least one other satellite following in the direction of movement towards a second communication axis, and
a holder which is arranged rotatably on the housing about an axis of rotation,
wherein the optical communication device being arranged on the holder.

The main feature of the navigation satellite according to the invention is a holder or a carrier, respectively, for an optical communication device, wherein the carrier or the holder, respectively, is rotatably arranged on/in the housing.

With "housing of the satellite", the satellite structure (without payload) is meant. This is also called "satellite bus". The payload would be the holder with the optical communication device and the navigation antenna. The optical communication device comprises, as a rule, two optical communication units which respectively define one optical communication axis, wherein the communication axis of the first optical communication unit is directed towards a satellite advancing in the direction of movement of the corresponding navigation satellite, while the optical communication axis of the second optical communication unit is directed towards a following satellite.

Thus, it is possible to establish and permanently maintain permanent optical connections to neighboring satellites in the same orbital plane (orbit).

In an expedient embodiment of the invention, it may be provided that the navigation antenna serves as a holder for the optical communication device or is arranged on the holder and is correspondingly rotatable. As the holder is used at the same time for the optical communication device as a navigation antenna, no additional carrier elements are required in the satellite structure for the optical communication device. The already existing navigation antenna is rather used as a carrier or holder, respectively, for the optical communication device and thus for the optical communication unit.

The first and the second optical communication device should advantageously be arranged pivotable on the holder or the navigation antenna, respectively, and movable to the extent that the corresponding navigation satellite can enter into communication with the neighboring satellite on the same orbit and can maintain this communication connection.

In a further expedient embodiment of the invention, it may be provided that the navigation antenna comprises a navigation signal emission side and, facing away therefrom, a rear side facing the housing, and that the optical communication device is arranged on the rear side of the navigation antenna. By the arrangement of the optical communication device and its units on the rear side of the navigation antenna, its emission side can be adapted and used as previously known.

As already mentioned above, optical communication connections between navigation satellites are advantageous. In this regard, the optical communication device of a navigation satellite can send signals for time transfer and time leveling (keyword "composite clock") and/or for distance measurement and/or for communication to at least one of the advancing and/or at least one of the following satellites and/or can receive corresponding signals.

According to a further aspect of the invention, which can be realized for a navigation satellite independent of the previously mentioned and without the implementation of the above-described features according to the invention, the optical communication device comprises a third optical communication unit for unidirectional or bidirectional signaling with a satellite arranged on a lower orbit, particularly in a Low Earth orbit (LEO). This measure makes it possible, despite the required two rotations by respectively 180° degrees per revolution, to establish and maintain a permanent optical connection of the navigation satellite on a first orbit to a satellite on a subjacent second orbit. The navigation satellite according to the invention is expediently provided for a Medium Earth Orbit (MEO), while the lower-flying satellite, which is not necessarily also a navigation satellite, is located in the Low Earth Orbit (LEO).

It is advantageous if the further optical communication unit is also arranged on the rotatable holder.

The further (third) optical communication unit is also located expediently on the rear side of the rotatable navigation antenna facing the housing of the satellite, i.e. the satellite structure, provided that the navigation antenna serves as a holder for the optical communication device. Thus, the optical axis defined by the third optical communication unit extends through the navigation antenna. It is expedient if the third optical communication unit is pivotably arranged on or in the navigation antenna, which can be realized, for example, by a ball joint in which the transmitter and/or der receiver of the third optical communication unit is arranged. Thus, the optical communication axis of the third optical communication unit can be aligned correspondingly to communicate with a lower-flying satellite.

It is also expedient if the further optical communication device is arranged above the holder and its optical communication axis is directed through an opening in the navigation antenna (namely, in particular in the phase center of the navigation antenna). The axis of rotation of the navigation antenna is expediently designed as a hollow axis. This hollow axis can for example enable the transmission of the navigation signals from the satellite to the navigation antenna as well as the integration of the third optical communication unit for the optical communication between the MEO navigation satellite and a LEO satellite, for example.

The two main variants according to the invention may also be described by the following feature groups, wherein individual features of each feature group may also be combined with individual features of another feature group:

1. A navigation satellite, particularly provided for a Medium Earth Orbit (MEO), comprising
    a housing,
    a navigation antenna arranged in and/or on the housing having an emission axis for the emission of navigation signals in an emission direction,
    an optical communication device for unidirectional or bidirectional communication with at least one other satellite advancing in the direction of movement and/or with at least one other satellite following in the direction of movement, and
    a holder which is arranged rotatably on the housing about an axis of rotation in emission direction,
    wherein the optical communication device being arranged on the holder.
2. The navigation satellite according to item 1, wherein the navigation antenna is designed as a plate-shaped holder for the optical communication device.
3. The navigation satellite according to item 2, wherein the navigation antenna comprises a navigation signal emission side and, facing away therefrom, a rear side facing the housing, and wherein the optical communication device is arranged on the rear side of the navigation antenna.
4. The navigation satellite according to any one of items 1 to 3, wherein the optical communication device comprises a first and a second optical communication unit which respectively define an optical communication axis which is arranged substantially orthogonally to the axis of rotation.
5. The navigation satellite according to item 4, wherein the two optical communication units are arranged substantially diametrically opposite with respect to the axis of rotation of the navigation antenna or the holder, respectively.
6. The navigation satellite according to any one of items 1 to 5, wherein the optical communication device comprises a third optical communication unit for unidirectional or bidirectional communication with a satellite arranged on a lower orbit, in particular in a Low Earth Orbit (LEO).
7. The navigation satellite according to item 6, wherein the third optical communication unit defines an optical communication axis in emission direction of the navigation antenna.
8. The navigation satellite according to item 7, wherein the optical communication axis of the third optical communication unit extends through an opening in the navigation antenna or the holder, respectively.
9. The navigation satellite according to item 7 or 8, wherein the third optical communication unit is pivotable one-dimensionally or two-dimensionally about the emission axis of the navigation antenna and/or is mounted in the housing or on and/or in the navigation antenna.
10. The navigation satellite according to item 8 or 9, wherein the opening is arranged in the phase center of the navigation antenna.
11. The navigation satellite according to any one of items 1 to 10, wherein the axis of rotation of the navigation antenna is designed as a hollow shaft.
12. A navigation satellite, particularly provided for a Medium Earth Orbit (MEO), comprising
    a housing,
    a navigation antenna arranged in and/or on the housing having an emission axis for the emission of navigation signals in a preferred emission direction, and
    an optical communication device for unidirectional or bidirectional communication with at least one other satellite advancing in the direction of movement and/or with at least one other satellite following in the direction of movement,
    wherein the navigation antenna is arranged rotatably on the housing about an axis of rotation in extension to the emission axis, and
    wherein the optical communication device is mounted to the rotatable navigation antenna.

Figure 2:
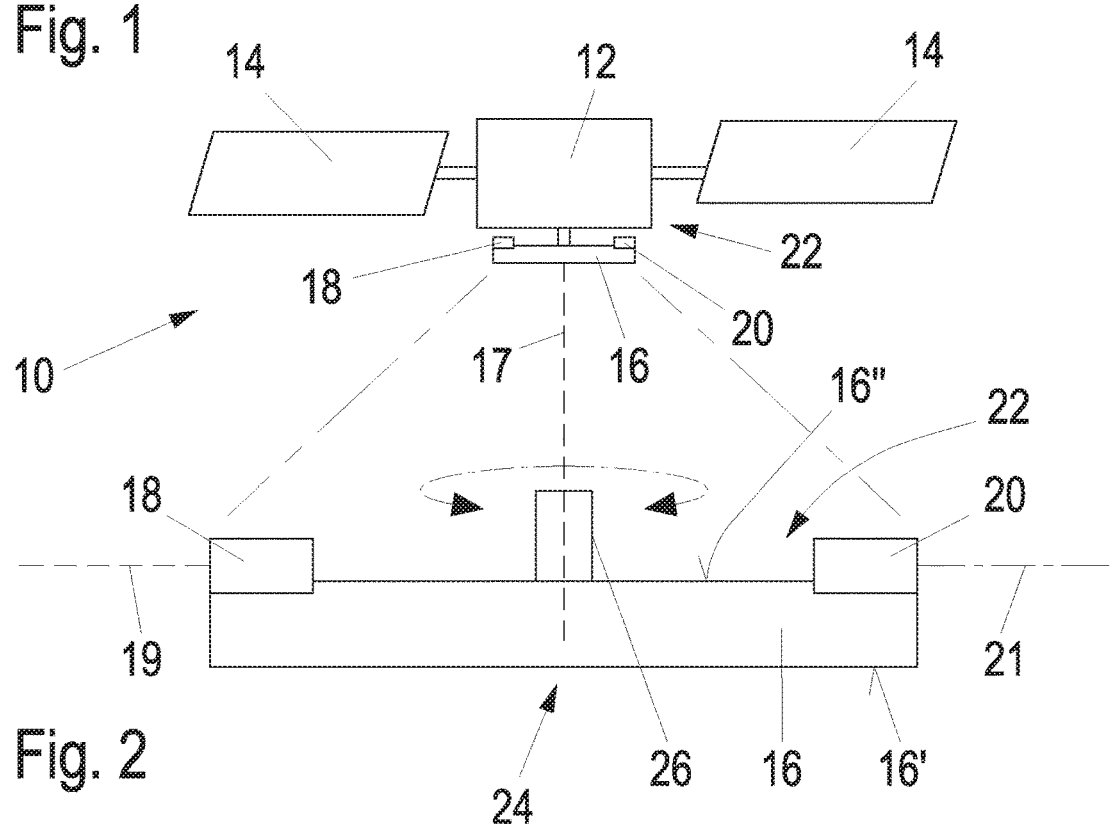

In the following, the invention is described in more detail by means of two exemplary embodiments and by reference to the drawing. The individual figures show:

FIG. 1 a satellite partial constellation consisting of a plurality of MED navigation satellites and a plurality of lower-flying LEO satellites, FIG. 2 a schematic representation of a navigation satellite according to an exemplary embodiment of the invention, wherein a portion of the navigation satellite is depicted in an enlarged view.

Figure 3:
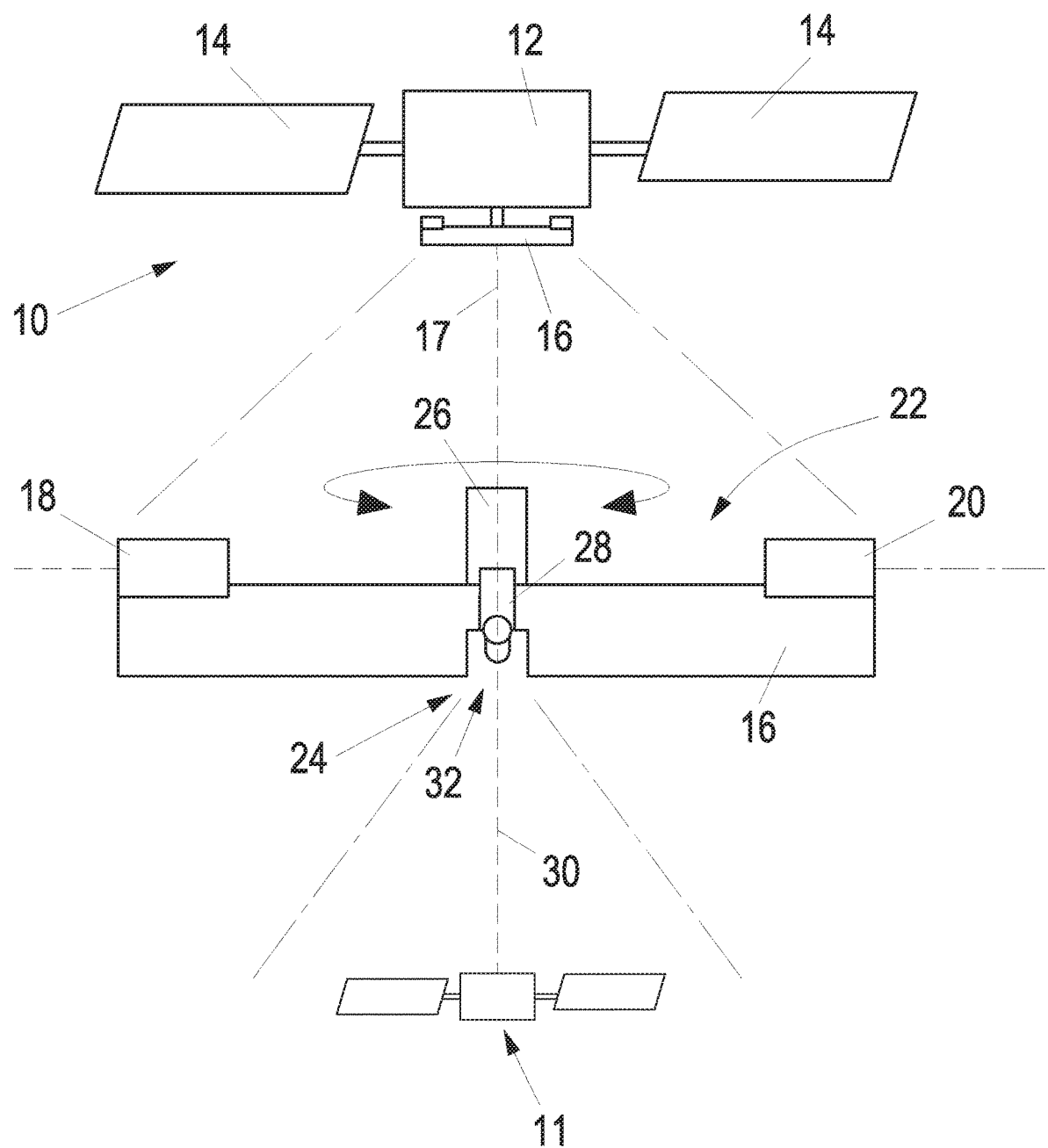

FIG. 3 a second exemplary embodiment of a navigation satellite according to the invention, wherein a portion of the satellite is also depicted in an enlarged view.

In the first exemplary embodiment of the invention, the optical transmitting and receiving systems are arranged on a rotatable carrier above the navigation antenna. The rotatable carrier provided for an additional axis which allows for keeping the two optical system directed towards the advancing or following satellites, respectively; they "look" past the navigation antenna, the two optical beams and the nadir direction lie in the same plane. For this purpose, only small corrections are required that can be carried out with a movable mirror. In addition, the angle in the orbit plane can be brought to a further position to illuminate the satellite after the next if the nearest-neighboring satellite has broken down. The navigation antenna can be mounted on the carrier. Thus, the azimuth angle measured around the nadir axis remains fixed. In particular, the noon-turn and the mid-night-turn do not have an effect on the navigation antenna in terms of signal emission. The fixed relationship between the optical alignment and the alignment of the antenna, which results through this arrangement, is of particular importance.

A further exemplary embodiment of the invention refers to an optical transmitting and receiving system above the navigation antenna which is arranged in such a way that the beam "looks" through a hole in the center of the antenna. The transmitting and receiving system can particularly be directed towards respectively one of a plurality of possible LEO satellite positions (approx. +/−18 degrees). The optical axis intersects the nadir axis. Ideally, this happens in the phase center of the navigation antenna.

FIG. 1 shows a satellite partial constellation consisting of a plurality of MEO navigation satellites 10, 10', 10" and a plurality of LEO satellites 11. Each navigation satellite 10, 10', 10" comprises a satellite structure with, inter alia, a housing 12 and a sun generator 14, and is provided with a rotatable navigation antenna 16 which maintains its orientation to the Earth. The navigation antenna 16 comprises a front emission side 16' and a back rear side 16". On rear side 16" of rotatable navigation antenna 16 (see the axis of rotation indicated at 17) the optical communication units 18, 20 (with optical communication axis 19 or 21) of an optical communication device 22 are mounted which ensure an optical inter-satellite connection to the advancing and the following satellite 10', 10".

FIG. 2 shows a detailed representation of the structure of the rotatable navigation antenna 16 together with the optical communication units 18, 20. In this regard, navigation antenna 16 is for example rotated in its phase center 24 about a hollow axis 26 which ensures the transmission of the signals from the satellite to navigation antenna 16 as well as the integration of a further optical communication unit for the communication between an MEO satellite 10, 10', 10" and LEO satellites 11.

The above-described additional third optical communication unit is shown in the exemplary embodiment of the MEO navigation satellite 10 shown in FIG. 3. Provided that the elements of the satellite according to FIG. 3 correspond to those of the satellite according to FIG. 2, they are provided with the same reference numerals. The additional third optical communication unit 28 is mounted above the navigation antenna 16, i.e. on its rear side 16", for example. Its optical communication axis 30 passes through the phase center 24 of the navigation antenna 16. By using a compact construction it can be ensured that the opening 32 required for this purpose in the navigation antenna 16 does not have an effect on its emission characteristics, and that an optical communication connection to a lower-flying LEO satellite 11 can be established at the same time. Depending on the orbit geometry, the third optical communication unit only has to cover a restricted angle and can thus be integrated within the navigation antenna 16, as shown in FIG. 3.

LIST OF REFERENCE NUMERALS 10 navigation satellites
10' navigation satellites
10" navigation satellites
11 LEO satellite
12 housing
14 sun generator
16 navigation antenna
16' emission side of navigation antenna
16" rear side of navigation antenna
17 axis of rotation
18 first optical communication unit
19 optical communication axis
20 second optical communication unit
21 optical communication axis
22 optical communication device
24 phase center
26 hollow axis
28 third optical communication unit
30 communication axis
32 opening in phase center

The invention claimed is:

1. A navigation satellite provided for a Medium Earth Orbit (MEO), comprising
a housing,
a navigation antenna connected to the housing for the emission of navigation signals in a preferred direction,
an optical communication device for unidirectional or bidirectional signaling with at least one other satellite advancing in the direction of movement towards a first communication axis and/or with at least one other satellite following in the direction of movement towards a second communication axis, and
a holder which is arranged rotatably on the housing about an axis of rotation, wherein the axis of rotation is substantially perpendicular to the first or second communication axis and wherein the holder is directly rotatable about the axis of rotation;
wherein the optical communication device being arranged on the holder.

2. The navigation satellite according to claim 1, wherein the navigation antenna serves as the holder for the optical communication device or is arranged on the holder.

3. The navigation satellite according to claim 2, wherein the navigation antenna comprises a navigation signal emission side and, facing away therefrom, a rear side facing the housing, and wherein the optical communication device is arranged on the rear side of the navigation antenna.

4. The navigation satellite according to claim 1, wherein the optical communication device sends signals for time transfer and time leveling and/or for distance measurement and/or for communication to at least one of the advancing satellites and/or at least one of the following satellites and/or receives such signals from at least one of the advancing satellites and/or one of the following satellites.

5. The navigation satellite according to claim 1, comprising a further optical communication device for unidirectional or bidirectional signaling with a satellite arranged on a lower orbit, particularly in a Low Earth orbit (LEO), towards a third communication axis.

6. The navigation satellite according to claim 5, wherein the further optical communication device is also arranged on the rotatable holder.

7. The navigation satellite according to claim 5 wherein the further optical communication device is arranged above the holder and is directed with its communication axis through an opening in the navigation antenna for unidirectional and bidirectional signaling.

8. The navigation satellite according to claim 7, wherein the opening is arranged in the phase center of the navigation antenna.

9. A navigation satellite provided for a Medium Earth Orbit (MEO), comprising
- a housing,
- a navigation antenna connected to the housing for the emission of navigation signals in a preferred direction,
- an optical communication device for unidirectional or bidirectional signaling with at least one other satellite advancing in the direction of movement towards a first communication axis and/or with at least one other satellite following in the direction of movement towards a second communication axis, and
- a holder which is arranged rotatably on the housing about an axis of rotation, wherein the navigation antenna serves as the holder or is arranged on the holder;
- wherein the optical communication device being arranged on the holder.

10. The navigation satellite according to claim 9, wherein the navigation antenna comprises a navigation signal emission side and, facing away therefrom, a rear side facing the housing, and wherein the optical communication device is arranged on the rear side of the navigation antenna.

11. The navigation satellite according to claim 9, wherein the optical communication device sends signals for time transfer and time leveling and/or for distance measurement and/or for communication to at least one of the advancing satellites and/or at least one of the following satellites and/or receives such signals from at least one of the advancing satellites and/or one of the following satellites.

12. The navigation satellite according to claim 9, comprising a further optical communication device for unidirectional or bidirectional signaling with a satellite arranged on a lower orbit, particularly in a Low Earth orbit (LEO), towards a third communication axis.

13. The navigation satellite according to claim 12, wherein the further optical communication device is also arranged on the rotatable holder.

14. The navigation satellite according to claim 12 wherein the further optical communication device is arranged above the holder and is directed with its communication axis through an opening in the navigation antenna for unidirectional and bidirectional signaling.

15. The navigation satellite according to claim 14, wherein the opening is arranged in the phase center of the navigation antenna.

16. A satellite constellation comprising:
- a plurality of Medium Earth Orbit (MEO) satellites in communication with each other, each satellite comprising:
  - a housing,
  - a navigation antenna connected to the housing for the emission of navigation signals in a preferred direction,
  - an optical communication device for unidirectional or bidirectional signaling with at least one other satellite in the plurality of MEO satellites advancing in the direction of movement towards a first communication axis and/or with at least one other satellite in the plurality of MEO satellites following in the direction of movement towards a second communication axis, and
  - a holder which is arranged rotatably on the housing about an axis of rotation, wherein the axis of rotation is substantially perpendicular to the first or second communication axis and wherein the holder is directly rotatable about the axis of rotation;
  - wherein the optical communication device being arranged on the holder.

17. The satellite constellation of claim 16, further comprising one or more Low Earth Orbit (LEO) satellites, and wherein each of the MEO satellites further comprise a further optical communication device for unidirectional or bidirectional signaling with the one or more LEO satellites, towards a third communication axis.

18. The satellite constellation of claim 17, wherein the further optical communication device is also arranged on the rotatable holder.

19. The satellite constellation of claim 17 wherein the further optical communication device is arranged above the holder and is directed with its communication axis through an opening in the navigation antenna for unidirectional and bidirectional signaling.

20. The satellite constellation of claim 19, wherein the opening is arranged in the phase center of the navigation antenna.

* * * * *